(12) United States Patent
Riguer et al.

(10) Patent No.: US 11,521,293 B2
(45) Date of Patent: *Dec. 6, 2022

(54) MEMORY MANAGEMENT IN GRAPHICS AND COMPUTE APPLICATION PROGRAMMING INTERFACES

(71) Applicants: Advanced Micro Devices, Inc., Santa Clara, CA (US); ATI Technologies ULC, Markham (CA)

(72) Inventors: Guennadi Riguer, Thornhill (CA); Brian K. Bennett, Northborough, MA (US)

(73) Assignees: Advanced Micro Devices, Inc., Santa Clara, CA (US); ATI Technologies ULC, Ontario (CA)

( * ) Notice: Subject to any disclaimer, the term of this patent is extended or adjusted under 35 U.S.C. 154(b) by 196 days.

This patent is subject to a terminal disclaimer.

(21) Appl. No.: 16/943,637

(22) Filed: Jul. 30, 2020

(65) Prior Publication Data
US 2020/0357093 A1 Nov. 12, 2020

Related U.S. Application Data

(63) Continuation of application No. 15/477,795, filed on Apr. 3, 2017, now Pat. No. 10,733,696, which is a continuation of application No. 14/560,757, filed on Dec. 4, 2014, now Pat. No. 9,612,884.

(51) Int. Cl.
| | | |
|---|---|---|
| *G06F 3/06* | (2006.01) | |
| *G06T 1/60* | (2006.01) | |
| *G06F 9/54* | (2006.01) | |
| *G06F 9/50* | (2006.01) | |
| *G06F 12/02* | (2006.01) | |
| *G06T 1/20* | (2006.01) | |
| *G09G 5/36* | (2006.01) | |

(52) U.S. Cl.
CPC ............... *G06T 1/60* (2013.01); *G06F 3/064* (2013.01); *G06F 9/5016* (2013.01); *G06F 9/54* (2013.01); *G06F 12/023* (2013.01); *G06T 1/20* (2013.01); *G09G 5/363* (2013.01)

(58) Field of Classification Search
CPC .......... G06F 3/064; G06F 9/5016; G06F 9/54; G06F 12/00; G06F 13/00; G06T 1/20; G09G 5/363
See application file for complete search history.

(56) References Cited

U.S. PATENT DOCUMENTS

| | | | |
|---|---|---|---|
| 8,928,680 B1 * | 1/2015 | Sanketi | G06T 1/60 345/543 |
| 9,785,332 B1 | 10/2017 | Karppanen | |
| 2005/0219241 A1 * | 10/2005 | Chun | H04N 13/363 348/E13.056 |

(Continued)

*Primary Examiner* — Tuan V Thai
(74) *Attorney, Agent, or Firm* — Volpe Koenig

(57) ABSTRACT

Methods are provided for creating objects in a way that permits an API client to explicitly participate in memory management for an object created using the API. Methods for managing data object memory include requesting memory requirements for an object using an API and expressly allocating a memory location for the object based on the memory requirements. Methods are also provided for cloning objects such that a state of the object remains unchanged from the original object to the cloned object or can be explicitly specified.

20 Claims, 8 Drawing Sheets

(56) References Cited

U.S. PATENT DOCUMENTS

| | | |
|---|---|---|
| 2008/0184063 A1 | 7/2008 | Abdulvahid |
| 2011/0185134 A1 | 7/2011 | Toews et al. |
| 2011/0242125 A1 | 10/2011 | Hall et al. |
| 2012/0259843 A1* | 10/2012 | Child ................ G06F 16/24569 707/769 |
| 2013/0057562 A1* | 3/2013 | Nordlund ............ G06F 12/0802 345/522 |
| 2013/0275656 A1 | 10/2013 | Talagala et al. |

* cited by examiner

MEMORY MANAGEMENT IN GRAPHICS AND COMPUTE APPLICATION PROGRAMMING INTERFACES

CROSS REFERENCE TO RELATED APPLICATIONS

This application is a continuation of U.S. patent application Ser. No. 15/477,795, filed Apr. 3, 2017, which is a continuation of U.S. patent application Ser. No. 14/560,757, filed Dec. 4, 2014, which issued as U.S. Pat. No. 9,612,884 on Apr. 4, 2017, the contents of which are incorporated by reference as if fully set forth herein.

FIELD OF INVENTION

The present invention relates to computer data structures generally, and more specifically to allocation of memory for data objects.

BACKGROUND

In computer graphics processing applications, a program executing on a central processing unit (CPU), may create an object which is accessible to a GPU to take advantage of the processing capabilities of a graphics processing unit (GPU). The program may store an object, such as an image object, in GPU memory such that a component of the GPU, such as a shader, may perform calculations on the object.

SUMMARY OF EMBODIMENTS

Some embodiments provide a method for managing data object memory. An object identifier is requested for an object using an application programming interface (API). Memory requirements are requested for the object based upon the object identifier using the API. A portion of a memory is determined for storing object data based upon the memory requirements for the object. The determined memory is bound to the object.

Some embodiments provide a method for managing data object memory. A data object identifier is provided in response to a data object identifier request to an application programming interface (API). Memory requirements are provided for the object in response to a memory requirements request to the API which includes the object identifier.

Some embodiments provide a method for creating a clone data object based on an original data object. Data of the data object is specified based on the original data object. A state of the data of the original data object as well as destination data object is specified to an application programming interface (API). The data of the data object having the specified state is written to a memory.

BRIEF DESCRIPTION OF THE DRAWINGS

A more detailed understanding may be had from the following description, given by way of example in conjunction with the accompanying drawings wherein.

DETAILED DESCRIPTION

Figure 1:
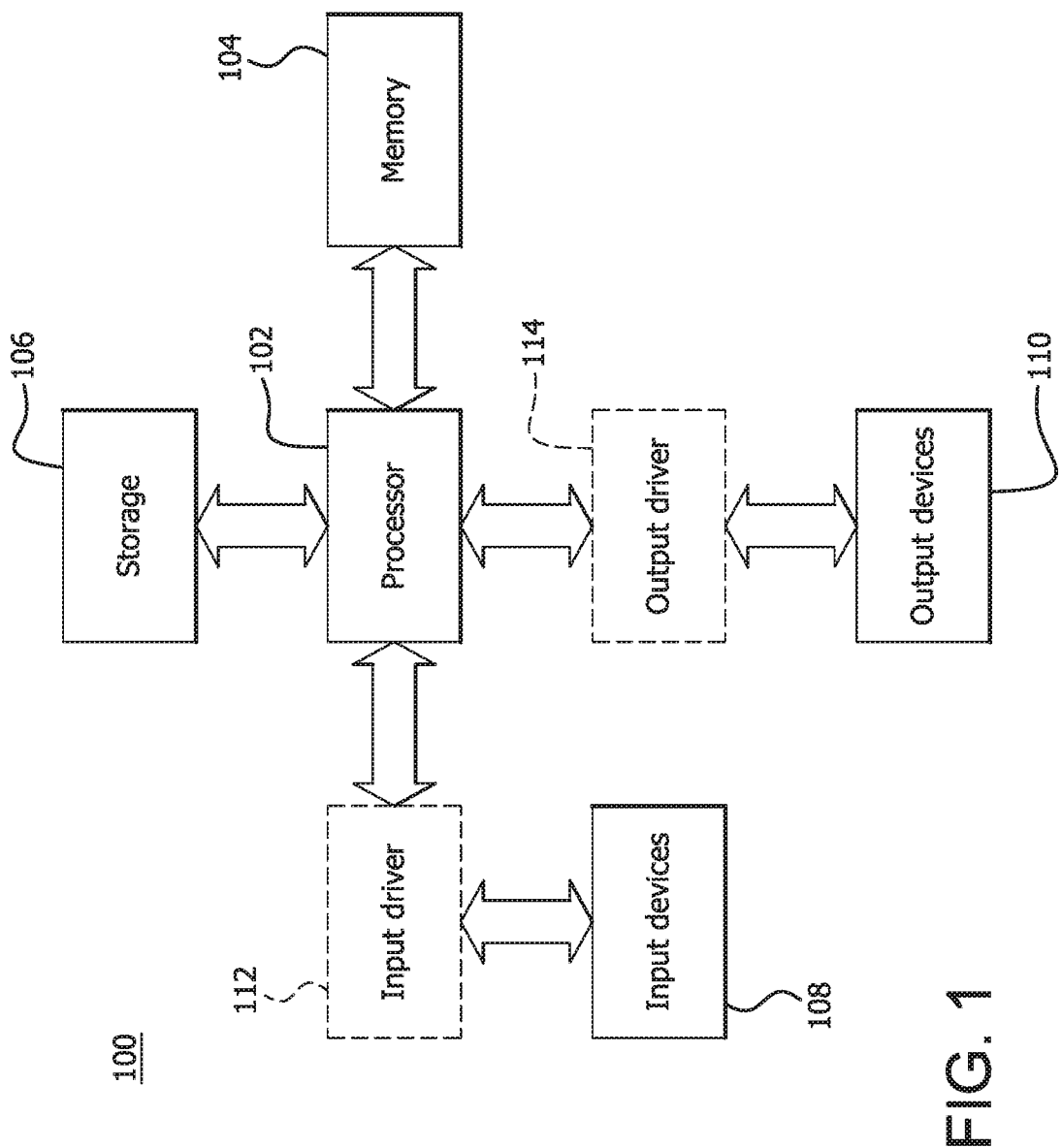
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU (different core types and sizes may be used on the single die or in the single package). The memory 104 may be located on the same die as the processor 102, or may be located separately from the processor 102. The memory 104 may include a volatile or non-volatile memory, for example, random access memory (RAM), dynamic RAM, or a cache. It is noted that memory 104 may be implemented as one or more discrete units and that device 100 may include multiple distinct memories (not shown). For example, device 100 may include both CPU and GPU memories (not shown) as further discussed herein.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

In various computing applications it may be desirable to use a dedicated graphics processing unit (GPU) to perform certain types of calculations on certain types of data to accelerate generation of graphical images from data or to perform other graphical or non-graphical calculations, such as calculations involving transformation of matrices.

To take advantage of the functionality of a GPU, a program running on a CPU or other computing device may store data in a memory location dedicated for use by the GPU. Such memory is referred to herein as GPU memory. It is noted that such memory may be located on or off of the GPU itself, on or off of a graphics card or daughterboard incorporating the GPU, in a portion of CPU memory or main memory, or in another location depending upon the desired implementation.

In general, data objects are data structures having associated data fields. In computer graphics applications, these fields may contain data, such as color; metadata, which may describe the layout of the data (for example image height and width); state information, such as data format or usage information for the data which indicates the state of the data in the object and/or how the data should be processed; or pointers to locations in memory where such data, metadata, and state are stored. In computer graphics processing applications, a program executing on a CPU (such as an end-user application like a game, CAD application, etc.) may create an object which is accessible to a GPU to take advantage of the processing capabilities of the GPU. The program may store an object, such as an image object, in GPU memory such that a component of the GPU, such as a shader, may perform calculations on the object. Such an object may be referred to as a GPU object.

Application Programming Interfaces (APIs) exist which specify ways in which a program running on a processor may interact with hardware and/or other software. Such APIs may be implemented as one or more libraries, for example, which may be used to specify a set of functions, routines, or object classes for interacting with the hardware and/or software in a standardized way. Such APIs may form part of an operating system (e.g., Microsoft Windows, Android from Google, etc.) running on a device 100.

Various APIs exist for computer graphics processing, and well-known computer graphics processing APIs include OpenGL and DirectX. Such APIs are typically used by computer programs to interact with a graphics processing unit (GPU) to perform hardware-accelerated rendering or other GPU tasks, and may be implemented as a library or set of libraries which the computer program can call during execution. These libraries may include specifications for object classes for use by a GPU and functions for creating such objects, among other things. A computer program which calls an API may be referred to as a client application, or API client.

Several methods of object creation are discussed herein whereby a graphics API is used for creating the object, allocating GPU memory for the object, and binding the object identifier to the allocated GPU memory. It is noted that these methods may not be limited to GPU applications, and may be generalized and applied to general computing applications using a compute API or other type of API for creating an object, allocating memory (such as main memory or CPU memory) for the object, and binding the object identifier to allocated memory.

Figure 2:
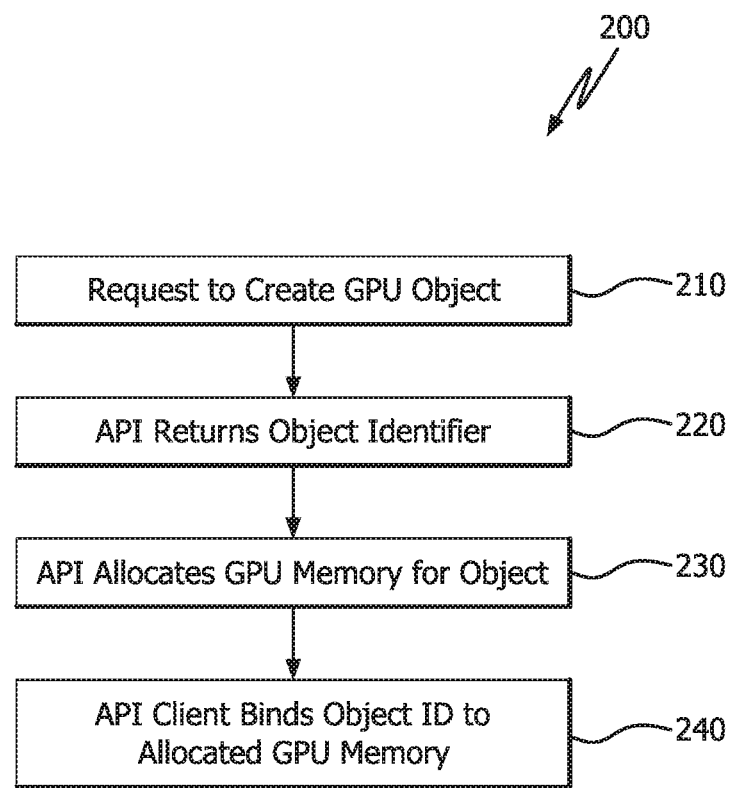
FIG. 2 is a flow chart illustrating an example method for GPU object creation using a graphics API.

FIG. 2 is a flow chart illustrating an example method 200 for GPU object creation using a graphics API.

In step 210, an API client may use an API to create a GPU object for use by a GPU, for example, by calling a library implementing the API.

In response to the object creation call, the API may return an object name, number, handle or other identifier for the object to the API client in step 220.

In addition to returning an identifier, GPU memory management tasks relating to the object may be performed according to the API in response to the object creation call in step 230. These memory management tasks may depend on the object type or class, and may include allocating a certain quantity or area of GPU memory for storing object data, metadata, state, and so forth. These memory management tasks may be performed according to the API without API client intervention, and the API client may not be able to configure or otherwise affect the memory management tasks. For example, a certain quantity of GPU memory may be allocated for the object in a certain available memory location according to the functionality of the API, and the API client may not be able to otherwise select, observe, or influence either the quantity or location of the allocated GPU memory.

After GPU memory has been allocated for the object, the API client may then bind the object identifier to the allocated GPU memory in step 240. Thereafter, the API client may command the GPU to perform operations on the GPU object.

Figure 3:
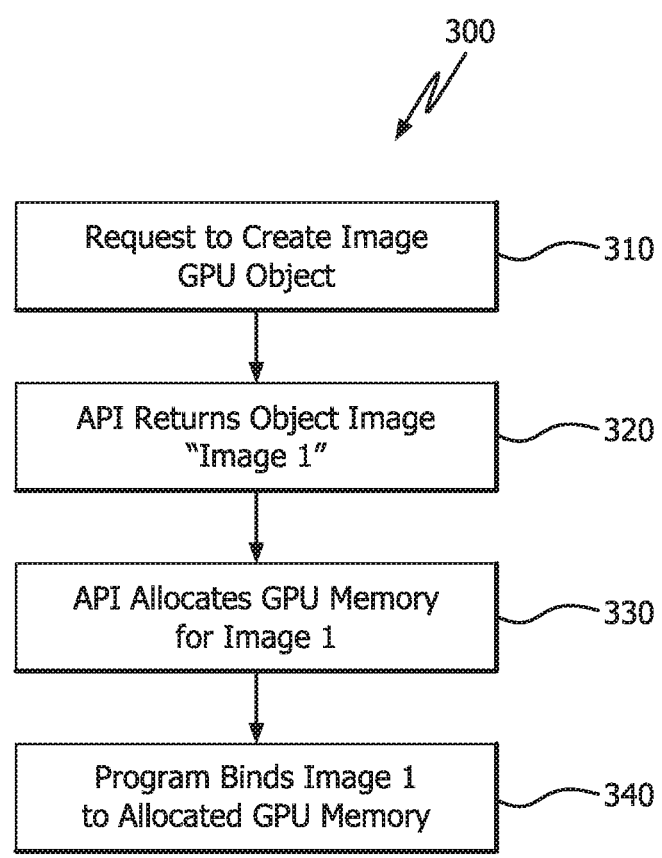
FIG. 3 is a flow chart illustrating an example method for image object creation using a graphics API.

FIG. 3 is a flow chart illustrating an example method 300 for creating a particular kind of object (in this case an image) using a graphics API.

In step 310, a computer program calls a library implementing the graphics API to create an image object in a GPU memory so that the GPU can perform operations on the image.

In response to the object creation call, the API returns an object name, for example "image 1," to the computer program in step 320.

In addition to returning the name of the object, GPU memory management tasks relating to the object image 1 are performed according to the API in response to the object creation call without further instructions from the computer program in step 330. These memory management tasks include allocating a quantity or region of a GPU memory specified by the API for the image object type. In this example, the computer program does not control the quantity of memory allocated or where it is allocated within the GPU memory beyond calling the API. The quantity and location of the allocated memory is also not explicitly returned to the program in this example.

The program then binds the object name to the allocated GPU memory and may proceed to command the GPU to perform operations on the object data in step 340. It is noted that other types of GPU objects may also be created in this way.

In some circumstances, it may be desirable to create GPU objects in a way that permits the API client to participate in GPU memory management for the GPU object.

Figure 4:
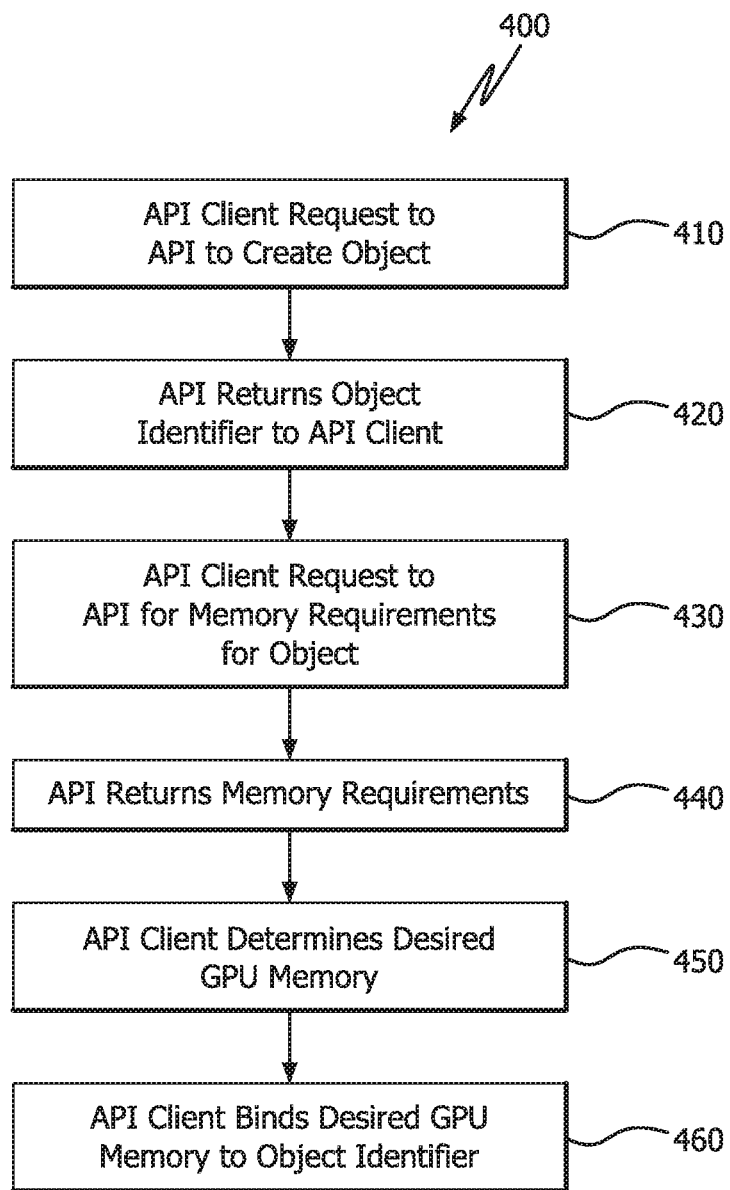
FIG. 4 is a flow chart illustrating another example method for GPU object creation using a graphics API.

FIG. 4 is a flow chart illustrating another example method 400 for GPU object creation using a graphics API. According to this approach, an API client may use an API to create a GPU object, for example, by calling a library implementing the API in step 410. In some implementations, the API client may only be required to pass information that is necessary to later determine memory requirements for the object. For example, the API client may pass a subset of object metadata such as image usage characteristics, its format, height and width, or object state such as compression state but refrain from passing object data such as pixel color. In this way, at the time the object identifier is generated, the GPU object only occupies memory required to refer to the object or to later allocate further memory to the object.

In response, the API may return an object name or other identifier for the object to the API client in step 420. Thereafter, the API client may request memory requirements for the object in step 430, for example, in another call to a library implementing the API. In response to the memory requirements call, the API may return memory requirements for the GPU object in step 440. For example, the memory requirements call may return a memory size, memory alignment, memory placement or footprint, or other types of memory specification for the GPU object type. These memory requirements may be requirements for storing object data and may be determined based on object metadata or object state. The API client may then determine a desired location or locations in GPU memory which fulfill the memory requirements for the object in step 450, and bind the GPU object identifier to the allocated GPU memory in step 460.

Unlike method 300, the API client in method 400 is provided with express knowledge of the memory requirements for the object, and may participate in allocating memory for the object. In some implementations, this may have the advantage of permitting greater flexibility in GPU memory management. For example, in some implementations the API client may alias a given memory footprint to more than one object by allocating that memory to each object. Further, the API client may reuse all or part of a given GPU memory location by subsequently allocating that memory location to a new GPU object or simply unbinding the memory from the GPU object. Still further, by separating object data memory allocation from object creation, GPU memory may be kept free until needed by the object.

Figure 5:
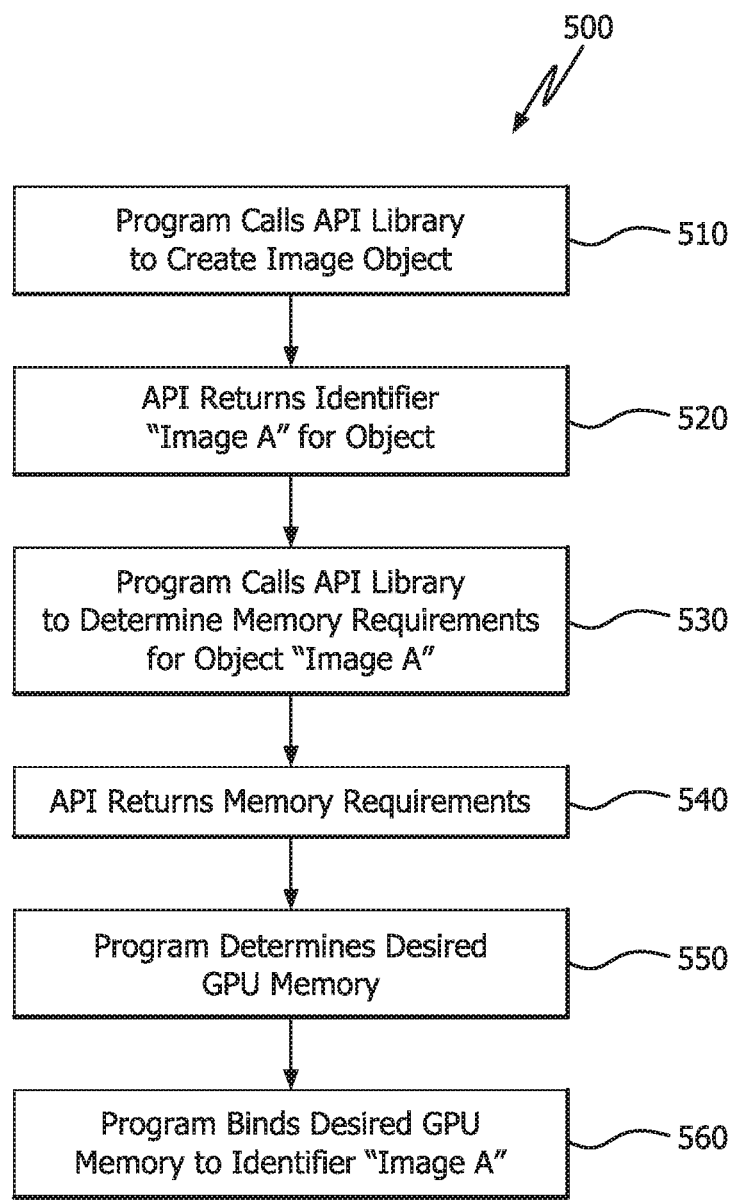
FIG. 5 is a flow chart illustrating another example method for image object creation using a graphics API.

FIG. 5 is a flow chart illustrating an example method 500 for image object creation using a graphics API. In step 510, a computer program calls a library implementing a graphics API to create an image type object. This call may contain only a subset of object metadata and/or state, and may not include object data.

In response to the object creation call, the API returns an object handle or a name, for example "image A," to the program in step 520. Subsequently, the program requests memory requirements for image A in another call to a library implementing the API in step 530. In response to the memory requirements call, the API returns memory requirements for image A in step 540, including memory size, memory location, and memory alignment. The program then determines a location in a GPU memory which fulfills the memory requirements in step 550. This determination may be made using another API call or using other non-API functionality such as a predetermined memory location, a call to a different API, or other program functionality. Thereafter, the program binds the identifier image A to the determined GPU memory in step 560, and data for image A may be stored in GPU memory at the bound location for subsequent operations using the GPU.

Explicitly allocating memory in this way may allow increased GPU memory flexibility in some implementations. For example, the GPU memory allocated to image A (or a portion of this memory) may be aliased to another object, e.g. "image B," by binding the identifier image B to the same GPU memory. The GPU memory allocated to image A may also be replaced by data for another object, e.g. "image C," by allocating the memory previously allocated to image A to image C and storing data, metadata, and/or state for image C in this memory location. This may enable more efficient use of GPU memory in some implementations as discussed above.

In addition to creating new GPU objects, it may also be desired to create a GPU object by copying another GPU object. A graphics API may provide a copy command for this purpose.

Figure 6:
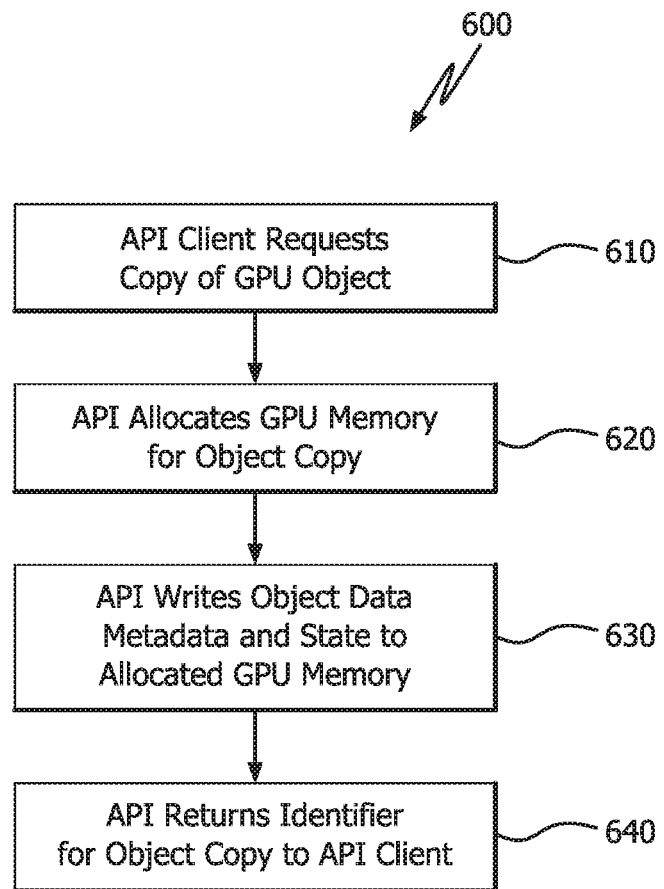
FIG. 6 is a flow chart illustrating an example method for object copying using a graphics API.

FIG. 6 is a flow chart illustrating an example method 600 for object copying using a graphics API. During execution, an API client may use a copy function of the API to copy a GPU object in step 610, for example by calling a library implementing the API. In response to the object copy call, the API may allocate an area of GPU memory for the a destination object for the copy in step 620, write the object data from the original object to the allocated GPU memory for the destination object, possibly including metadata and state, to the allocated area of GPU memory in step 630, and return an identifier for the destination object to the API client in step 640. It is noted that during execution of the copy function the API may take into account the state of the original object, and may change the state of the original object and destination object.

The allocation of GPU memory and copying of object data, metadata, and state may be performed according to the API without API client intervention, and the API client may not be able to configure or otherwise affect the API memory allocation or copying procedures. For example, a certain quantity of GPU memory may be allocated for the object in a certain available memory location according to the functionality of the API, and the API client may not be able to select, observe, or influence either the quantity or location of the allocated GPU memory. Further, the copy functionality of the API may change the state of the data during the copy. For example, if the original object contains compressed data, the API may decompress the original object data (i.e. change its state), and write the decompressed data to the destination object (which will reflect the changed decompressed state). The API may also write the decompressed data to the original object.

In some circumstances, it may be desirable to copy GPU objects in a way that permits the API client to participate in memory management for the GPU object or to control other features of the copied object, according to the source object state and desired destination object state provided by the API client. In this context, an example of state may be a format of the data or whether the data is compressed or uncompressed, and/or information which may be used to process or maintain the object data state, for example, GPU operations or commands which may be used to process or manage the object's data, metadata, or state.

In this case, an API may support a type of copy command which creates a new GPU object based on an original GPU object while explicitly controlling or influencing the state of the copied object. This operation may be referred to as cloning. In an example, if an original GPU object contains data in a compressed state, it may be specified that this data not be decompressed before copying. In contrast, this cannot be specified in a copy operation and it may not be known whether data was decompressed or decompressed and recompressed by the copy operation. In another example, it may be specified that the state of the clone object be different from the state of the original object. This may permit, for example, data to be explicitly decompressed as a part of the cloning operation.

Figure 7:
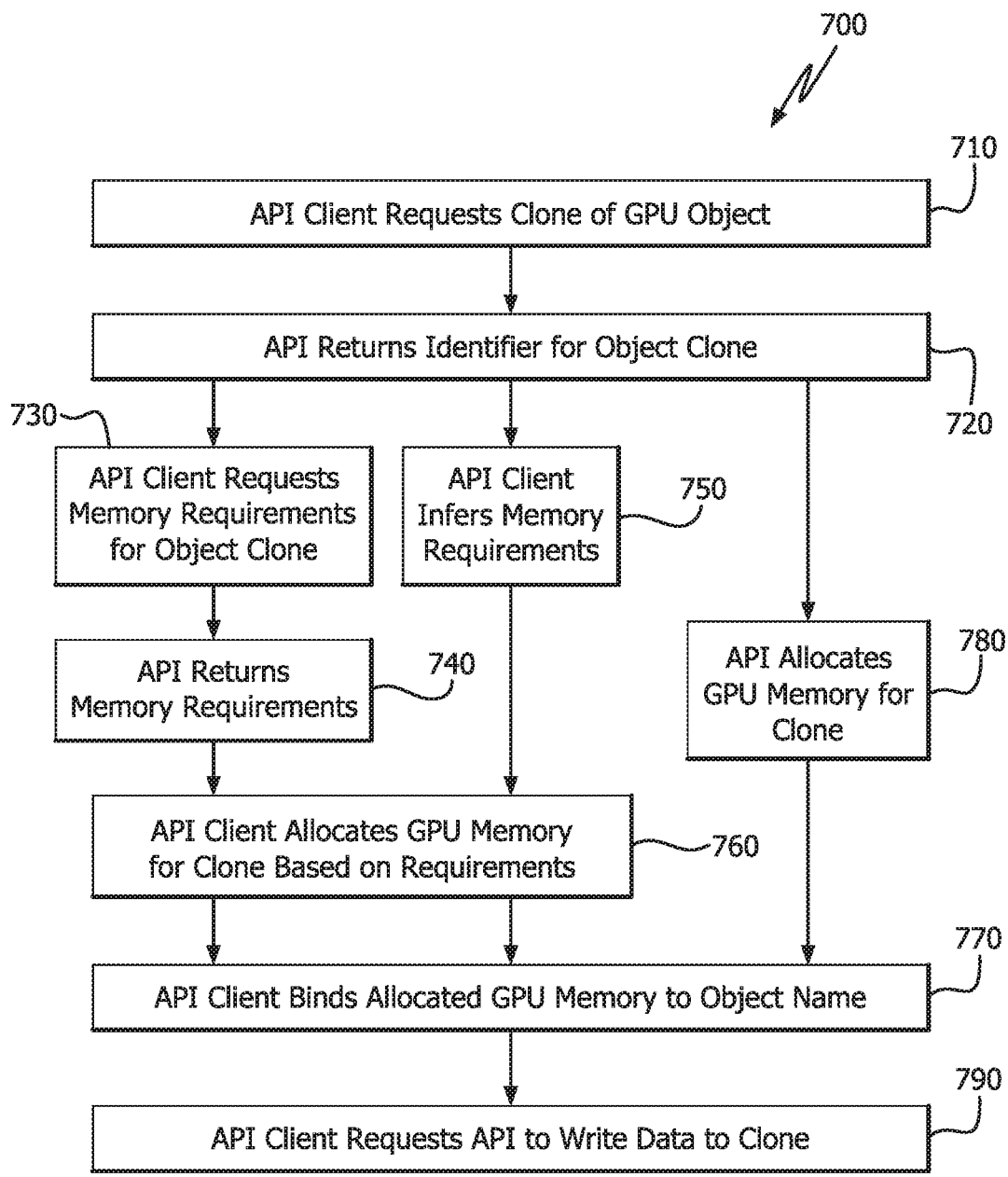
FIG. 7 is a flow chart illustrating an example method for object cloning using a graphics API.

FIG. 7 is a flow chart illustrating an example method 700 for object cloning using a graphics API. In step 710 an API client may use an API to clone a GPU object, for example, by calling a library implementing the API. The API client may pass enough information in the object cloning call to specify the original object and a desired state of the destination object. The API client may also specify whether the state of the original object should remain the same or change, and/or may specify that the state of the destination object should remain the same as the original object throughout the cloning process or change to a different specified state. In some implementations, the API client may need to pass only this information with the object cloning call. The API may return an object name (or other identifier) for the destination object to the API client in step 720. Memory management using cloning may follow one or another of the approaches discussed herein depending on the desired implementation.

For example, after receiving an identifier for the destination object, the API client may request memory requirements (such as memory size, memory alignment, memory placement or footprint, or other types of memory specification as discussed above) for the destination object from the API in step 730. In response, the API may return the memory requirements for the destination object in step 740. In another approach, the API client may infer memory requirements for the destination object based upon the requirements of the original GPU object and the desired state of the destination object in step 750. In either case, the API client may determine a desired location or locations in GPU memory which fulfill the returned memory requirements for the destination object in step 760, and may bind the destination object to the allocated GPU memory in step 770.

Thereafter the API client may call a function of the API in step 790, passing identifiers for the source and destination objects. In response to the function call the API may store data and metadata for the destination object in GPU memory at the bound location for subsequent operations using the GPU. The destination object metadata and data may be stored by the API without modification, or modified, depending on a desired state of the destination object passed with the function call in step 790 or in step 710. The source object metadata and data may remain unchanged or may be modified based on a desired state of the source object passed with the function call in step 790 or in step 710.

It is noted that this type of API client driven memory management, which may be available for a cloning operation, may not be possible using a copy operation because the copy operation may change the state of the source or destination object data during copying without notifying the API client or soliciting input from the API client. In this case, an API client's explicit memory allocation for a copy operation might match the original GPU object but not match the copy, resulting in errors or corrupted GPU memory when data for the copied object is written to an area of GPU memory which does not match the data size or footprint, for example. Thus it may be impossible for the API client to correctly allocate GPU memory explicitly for a copy because it may have no way of determining or inferring the state of the object copy's data until after the copy operation is complete. In approaches using cloning however, the API client may expressly require the object state of the clone to match the original, which may permit the API client to correctly allocate GPU memory for the clone.

It is noted that it may be desired to implement cloning with API memory management rather than the API client specified memory management discussed above. For example, the API client may specify that the data state should remain the same during the cloning operation, but permit the API to handle memory management by allocating GPU memory for the clone in step 780. In this case, the API client may bind the cloned object to memory allocated by the API in step 770 without intervening in allocating the memory and possibly without full knowledge of the memory allocation.

Figure 8:
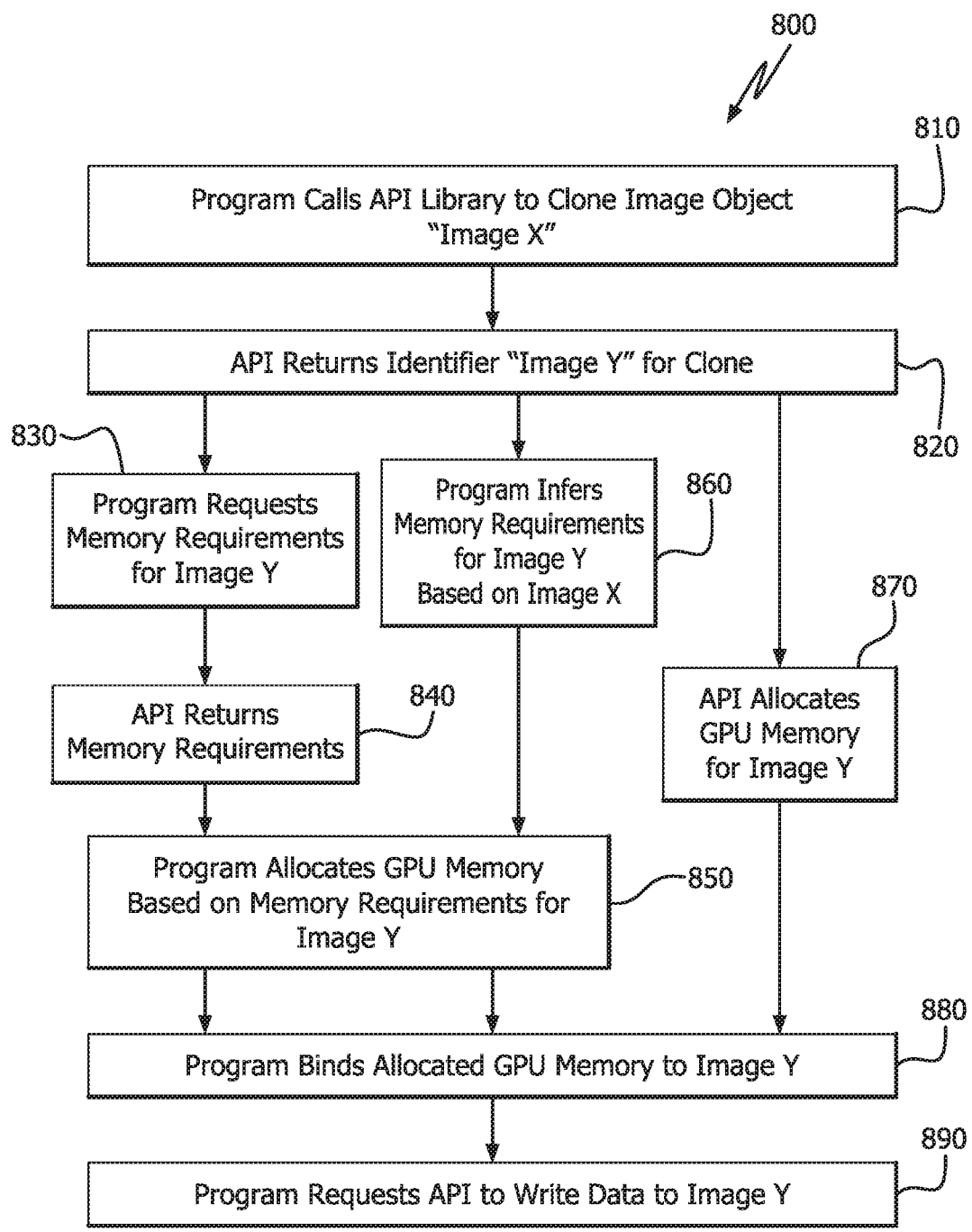
FIG. 8 is a flow chart illustrating an example method for image object cloning using a graphics API.

FIG. 8 is a flow chart illustrating an example method 800 for image object cloning using a graphics API. In step 810 a computer program calls a library implementing a graphics API to clone an image type object having an identifier, for example "image X", and may specify a desired state for the destination object. The program may also specify whether the state of the image X should remain the same or change, and/or may specify that the state of the destination object should remain the same as the original object throughout the cloning process or change to a different state. In response to the object cloning call, the API returns a name for the destination object, for example "image Y," to the API client in step 820.

At this stage several implementations are possible. In one approach, the program may request memory requirements for image Y in another call to a library implementing the API in step 830. In response, the API returns memory requirements in step 840, and the program determines an area or areas of GPU memory to allocate for image Y based on the returned memory requirements in step 850.

In another approach, the program may infer the memory requirements for image Y based on its knowledge of the memory requirements for image X in step 860, and determine an area or areas of GPU memory to allocate to image Y in step 850 based on the inferred memory requirements. This may be possible because the computer program has explicitly directed the API to maintain the state of image X for cloning to image Y, or to change the state of image X or image Y to a particular state, and can duplicate or extrapolate the memory requirements for image Y from the memory requirements for object X.

In yet another possible approach, the API may allocate GPU memory without intervention by the program in step 870 based upon the memory requirements of image Y.

In any of these cases, the API client thereafter binds the object image Y to the determined GPU memory in step 880.

Thereafter the API client may call a function of the API in step 890, passing identifiers for the source and destination objects "image X" and "image Y". In response to the function call the API may store data and metadata, for image Y in GPU memory at the bound location for subsequent operations using the GPU. The data and metadata stored for image Y may be stored by the API without modification, or modified, depending on a desired state of image Y passed with the function call in step 890 or in step 810. Similarly, the source object metadata and data may remain unchanged or may be modified based on a desired state of image X passed with the function call in step 890 or in step 810.

For example, if the state of image Y is specified as "compressed" in step 710, the data from image X will be written to image X in compressed form. If the state of image X is also specified as "compressed," the data may not be decompressed during the cloning operation. In another example, if the state of image Y is specified as "decompressed" but the state of image X is specified as "compressed," the data written to image Y will be decompressed, however no decompression will be performed on the data resident in memory for image X.

It is noted that in some implementations it may not be necessary for the API to create a destination object for the cloning process. For example, if the destination object image Y is pre-created by the API and bound to appropriate memory based on its desired state, the program may pass identifiers for source object image X and destination object image Y along with their desired states to the API in a function call. The cloning operation may then proceed as described above regarding step 890 (and step 790 described above with respect to FIG. 7).

The following pseudocode illustrates an example of a memory binding procedure consistent with some of the implementations described herein:

```
void AllocAndBindImageMemory(OBJECT object)
{
    MEMORY_REQUIREMENTS memReqs = { };
    SIZE_T reqSize = sizeof(MEMORY_REQUIREMENTS);
    // Get memory requirements
    GetObjectInfo (object,
            INFO_TYPE_MEMORY_REQUIREMENTS,
            &reqSize, &memReqs);
    if (memReqs.size > 0)
    {
        // If object has memory requirements, the client finds where
        // it can be placed in memory...
        SIZE_T bindOffs = 0;
        GPU_MEMORY mem = GetMatchingMemObject(&memReqs, &bindOffs);
        // ... and binds API object to that memory
        BindObjectMemory(object, mem, bindOffs);
    }
}
```

Here, the program calls the API using GetObjectInfo to obtain memory size "reqSize" and other memory requirements "memReqs" for a GPU object "object." The program then determines a suitable area of GPU memory using GetMatchingMemObject. In this example, GetMatchingMemObject may be a part of the API, or may be specified by the program or part of another library. An optional memory offset bindOffs may also be specified. Once the program has determined an appropriate GPU memory location "mem," the program binds the object name "object" to the memory location using the BindObjectMemory call to the API.

The following pseudocode illustrates an example of creation of an image object according to some of the implementations described herein, where "imgInfo" represents metadata for an object "image":

```
IMAGE_CREATE_INFO imgInfo = { };
imgInfo.imageType   = IMAGE_TYPE_2D;
imgInfo.format      = format;
imgInfo.arraySize   = 1;
imgInfo.extent.width  = 256;
imgInfo.extent.height = 256;
imgInfo.extent.depth  = 1;
imgInfo.mipLevels   = 5;
imgInfo.samples     = 1;
imgInfo.tiling      = OPTIMAL_TILING;
imgInfo.usage       = IMAGE_USAGE_SHADER_ACCESS_READ;
IMAGE image = NULL_HANDLE;
// Create image using provided parameters
RESULT result = CreateImage(device, &imgInfo, &image);
if (result == SUCCESS)
{
    // And after creation query memory requirements and bind memory as
    // in example above
    AllocAndBindImageMemory(image);
}
```

Here, the program API client calls the API using CreateImage to create the object "image." In this example, the API call passes the identity of the GPU (device) or its context, the relevant subset of the metadata for the object (imgInfo), and a storage for the name or handle of the object (image) to the API. Here, only enough information to determine memory requirements for the object is passed to the API at this stage. Thus, only a part of the image metadata (e.g. width, height, and so forth) and part of the state (e.g. format, usage) is provided for the image, while data (e.g. color) and remaining parts of state and metadata are not provided. At this stage, no memory is allocated for the image data, which may have the advantage of conserving memory or increasing the flexibility of memory usage. Memory is subsequently allocated for the object and bound to the object identifier according to one of the methods described herein.

It should be understood that many variations are possible based on the disclosure herein. Although features and elements are described above in particular combinations, each feature or element may be used alone without the other features and elements or in various combinations with or without other features and elements.

It is noted that example computer code and psuedocode listings herein are illustrative only, and that the described functionality may be implemented using various other computer languages, structures, and APIs, or may be implemented in hardware where appropriate.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processor configured for managing object memory, the processor comprising:

circuitry configured to receive, by an application programming interface ("API"), from a client, a request to create an object;

circuitry configured to return, to the client, by the API, a graphics processing unit (GPU) object identifier in response to a GPU object identifier request;

circuitry configured to return, by the API, to the client, memory requirements for the GPU object in response to a memory requirements request to the API which includes the GPU object identifier;

circuitry configured to receive, by the API, a request from the client to bind a portion of GPU memory specified by the client to the GPU object identifier; and circuitry configured to, in response to the request to bind the portion of GPU memory to the GPU object, bind the portion of GPU memory to the GPU object identifier.

2. The processor of claim 1, wherein the GPU object identifier request includes only information necessary to return the memory requirements in response to the memory requirements request.

3. The processor of claim 1, wherein the GPU object identifier request includes GPU object metadata.

4. The processor of claim 1, wherein the GPU object identifier request does not include GPU object data.

5. The processor of claim 1, wherein memory for the GPU object is not allocated by the API.

6. The processor of claim 1, wherein memory for the GPU object is allocated by an API client which passes the memory requirements request to the API.

7. The processor of claim 1, wherein memory for the GPU object is allocated based on the memory requirements.

8. The processor of claim 1, wherein memory for the GPU object is allocated in response to the memory requirements.

9. The processor of claim 1, wherein memory for GPU object data is allocated only after the memory requirements are returned.

10. A processor configured for cloning a graphics processing unit (GPU) object based on an original GPU object, the processor comprising:

circuitry configured to create a destination GPU object;

circuitry configured to pass data of the destination GPU object to an application programming interface (API) based on the original GPU object;

circuitry configured to pass a state of the data of the destination GPU object to the API; and circuitry configured to write the data of the destination GPU object having the state to a memory.

11. The processor of claim 10, further comprising circuitry configured to pass a state of the original GPU object to the API.

12. The processor of claim 10, wherein the original GPU object comprises a texture.

13. The processor of claim 10, wherein the state of the data of the destination GPU object is a compressed state.

14. The processor of claim 10, wherein the state of the data of the destination GPU object is a different video encoding.

15. The processor of claim 10, wherein the memory is accessible to a GPU.

16. A processor configured for cloning a data object based on an original data object, the processor comprising:

circuitry configured to create a destination data object;

circuitry configured to pass data of the destination data object to an application programming interface (API) based on the original data object;

circuitry configured to pass a state of the data of the destination data object to the API; and circuitry configured to write the data of the destination data object having the state to a memory.

17. The processor of claim 16, further comprising circuitry configured to pass a state of the original data object to the API.

18. The processor of claim 16, wherein the state of the data of the destination data object is a compressed state.

19. The processor of claim 16, wherein the memory is accessible to a graphics processing unit (GPU).

20. The processor of claim 16, wherein the data of the destination data object comprises image data.

* * * * *